United States Patent
Andris

(10) Patent No.: US 12,166,428 B2
(45) Date of Patent: Dec. 10, 2024

(54) GATE DRIVER CIRCUIT FOR PRIMING A SWITCHED RELUCTANCE GENERATOR CONVERTER

(71) Applicant: Caterpillar Inc., Peoria, IL (US)

(72) Inventor: Eric M. Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 317 days.

(21) Appl. No.: 17/647,913

(22) Filed: Jan. 13, 2022

(65) Prior Publication Data

US 2023/0223876 A1 Jul. 13, 2023

(51) Int. Cl.
*H02M 7/537* (2006.01)
*H02M 1/08* (2006.01)
(Continued)

(52) U.S. Cl.
CPC .............. *H02M 7/537* (2013.01); *H02M 1/08* (2013.01); *H02M 1/36* (2013.01); *H02M 7/5375* (2013.01); *H02P 9/009* (2013.01)

(58) Field of Classification Search
CPC ..... H02M 7/5375; H02M 1/36; H02M 1/0006
See application file for complete search history.

(56) References Cited

U.S. PATENT DOCUMENTS

| 6,906,490 B2 | 6/2005 | Turner | |
|---|---|---|---|
| 2008/0304189 A1* | 12/2008 | Tang | H02H 7/1222 318/434 |

(Continued)

FOREIGN PATENT DOCUMENTS

| CN | 106452271 A | 2/2017 |
|---|---|---|
| CN | 107769648 A | 3/2018 |

(Continued)

OTHER PUBLICATIONS

Wang Wenchao et al: "Control system of switched reluctance generator", 2017 IEEE Conference of Russian Young Researchers in Electrical and Electronic Engineering (EICONRUS), IEEE, Feb. 1, 2017 (Feb. 1, 2017), pp. 1064-1069, XP033088801, DOI: 10.1109/EICONRUS. 2017.7910740 [ retrieved on Apr. 24, 2017] abstract; figures1,3,4-6.

(Continued)

*Primary Examiner* — Kyle J Moody
*Assistant Examiner* — Jye-June Lee
(74) *Attorney, Agent, or Firm* — Lee & Hayes; Jeff A. Greene

(57) ABSTRACT

An example converter for a switched reluctance (SR) generator includes one or more gate driver circuits that are not only used to synchronously control switches, such as insulated gate bipolar transistors (IGBTs) of the converter, but also used to provide priming function during start-up of the generator. Since, an SR generator does not have to ability to self provide magnetic flux, priming current is provided to coils of the SR generator to initiate a magnetic flux. By using the gate drive circuit to provide the priming current, an additional priming circuit is not required. As a result, the converter design is more streamlined, with reduced complexity, cost, and size. When a bus voltage of the converter is below a threshold level, the one or more gate drive circuits can provide the priming current on the bus to initiate the SR generator.

20 Claims, 5 Drawing Sheets

(51) Int. Cl.
*H02M 1/36* (2007.01)
*H02M 7/5375* (2006.01)
*H02P 9/00* (2006.01)

(56) References Cited

U.S. PATENT DOCUMENTS

| | | |
|---|---|---|
| 2010/0123426 A1 | 5/2010 | Nashiki |
| 2013/0106338 A1 | 5/2013 | Kim et al. |
| 2020/0313581 A1* | 10/2020 | Chon ...................... H02M 1/36 |
| 2023/0158897 A1* | 5/2023 | Linn ..................... B60L 3/0084 |
| | | 701/22 |

FOREIGN PATENT DOCUMENTS

| | | |
|---|---|---|
| CN | 108988730 A | 12/2018 |
| CN | 109004879 A | 12/2018 |
| CN | 112003539 A | 11/2020 |
| EP | 0564067 B1 | 6/1997 |
| JP | H07308093 A | 11/1995 |

OTHER PUBLICATIONS

Written Opinion and International Search Report for Int'l. Patent Appln. No. PCT/US2022/060291, mailed Apr. 24, 2023 (14 pgs).

\* cited by examiner

GATE DRIVER CIRCUIT FOR PRIMING A SWITCHED RELUCTANCE GENERATOR CONVERTER

TECHNICAL FIELD

The present disclosure relates to a switched reluctance generator converter. More specifically, the present disclosure relates to using the gate driver circuitry of a switched reluctance generator converter to prime the switched reluctance generator.

BACKGROUND

Switched reluctance (SR) generators are generally mechanically coupled to a primary mover, such as an engine, to convert the mechanical energy of the primary mover to electrical energy. However, a SR generator does not include any permanent magnets, and therefore, the SR generator is not self-fluxing. In other words, the SR generator does not inherently generate magnetic flux for generating current. Because SR generators do not include magnets, such as strong permanent magnets made from rare earth metals, SR generators are a cost-effective solution for generating power from rotational primary mover mechanical energy sources. However, to use an SR generator a magnetic flux needs to be established before power is generated. As a result, a small current is conventionally injected in coils of the SR generator, referred to as priming, to initiate magnetic flux that is self-sustaining when the SR generator starts to generate electrical energy.

The SR generator may be electrically coupled to a converter to provide direct current (DC) at any suitable power output from the converter. Conventional converters include a priming circuit to provide the priming current on the bus to initiate magnetic flux generation in the coils of the SR generator. Thus, the power generation from the SR generator typically requires conventional converters with additional circuitry, and often additional voltage levels, to enable priming the SR generator. These additional circuit components add additional cost, size, and/or complexity to conventional converter circuits for SR generators.

An example of priming an SR generator is described in U.S. Pat. No. 6,906,490 (hereinafter referred to as the '490 patent), where a converter is described to have a priming winding with a separate voltage source to initiate magnetic flux in the SR generator. Thus, in the '490 patent, additional hardware, such as the winding and the voltage source is needed to prime the SR generator. This can add cost, size, and/or complexity to the SR generator and/or the converter.

Example embodiments of the present disclosure are directed toward overcoming the deficiencies described above.

SUMMARY

In an example of the disclosure, a converter includes a bus and at least one phase leg. The at least one phase leg includes a first phase leg having an insulated gate bipolar transistor (IGBT), a metal oxide semiconductor field effect transistor (MOSFET), and a gate drive circuit electrically coupled to a first gate of the IGBT and a first node of the MOSFET. The gate drive circuit is configured to selectively provide a gate drive voltage to the gate of the IGBT based at least in part on a commutation signal received from a controller and provide, when the MOSFET is turned on, the gate drive voltage to the bus.

In another example of the disclosure, a system includes a switched reluctance (SR) generator, a bus electrically coupled to the SR generator, and a converter comprising a first phase leg. The first phase leg includes an insulated gate bipolar transistor (IGBT), a metal oxide semiconductor field effect transistor (MOSFET), a gate drive circuit electrically coupled to a first gate of the IGBT and a first node of the MOSFET. The gate drive circuit is configured to control the IGBT based at least in part on a commutation signal received from a controller and provide the gate drive voltage on the bus via the MOSFET, wherein providing the gate drive voltage on the bus via the MOSFET induces a magnetic field in one or more coils of the SR generator.

In still another example of the disclosure, a method includes receiving, from a controller, a commutation signal and providing, by a gate drive circuit of a converter and based at least in part on the commutation signal, a gate drive voltage on a gate of an insulated gate bipolar transistor (IGBT). The method further includes providing, by the gate drive circuit, the gate drive voltage on a node of a metal oxide semiconductor field effect transistor (MOSFET), the MOSFET coupled to a bus of the converter, determining, by a sensing circuit, that a bus voltage on the bus is less than a threshold level, and providing, based at least in part on the bus voltage being less than the threshold level, a priming enable signal on a gate of the MOSFET to conduct the gate drive voltage to the bus.

DETAILED DESCRIPTION

Wherever possible, the same reference numbers will be used throughout the drawings to refer to the same or like parts.

Figure 1:
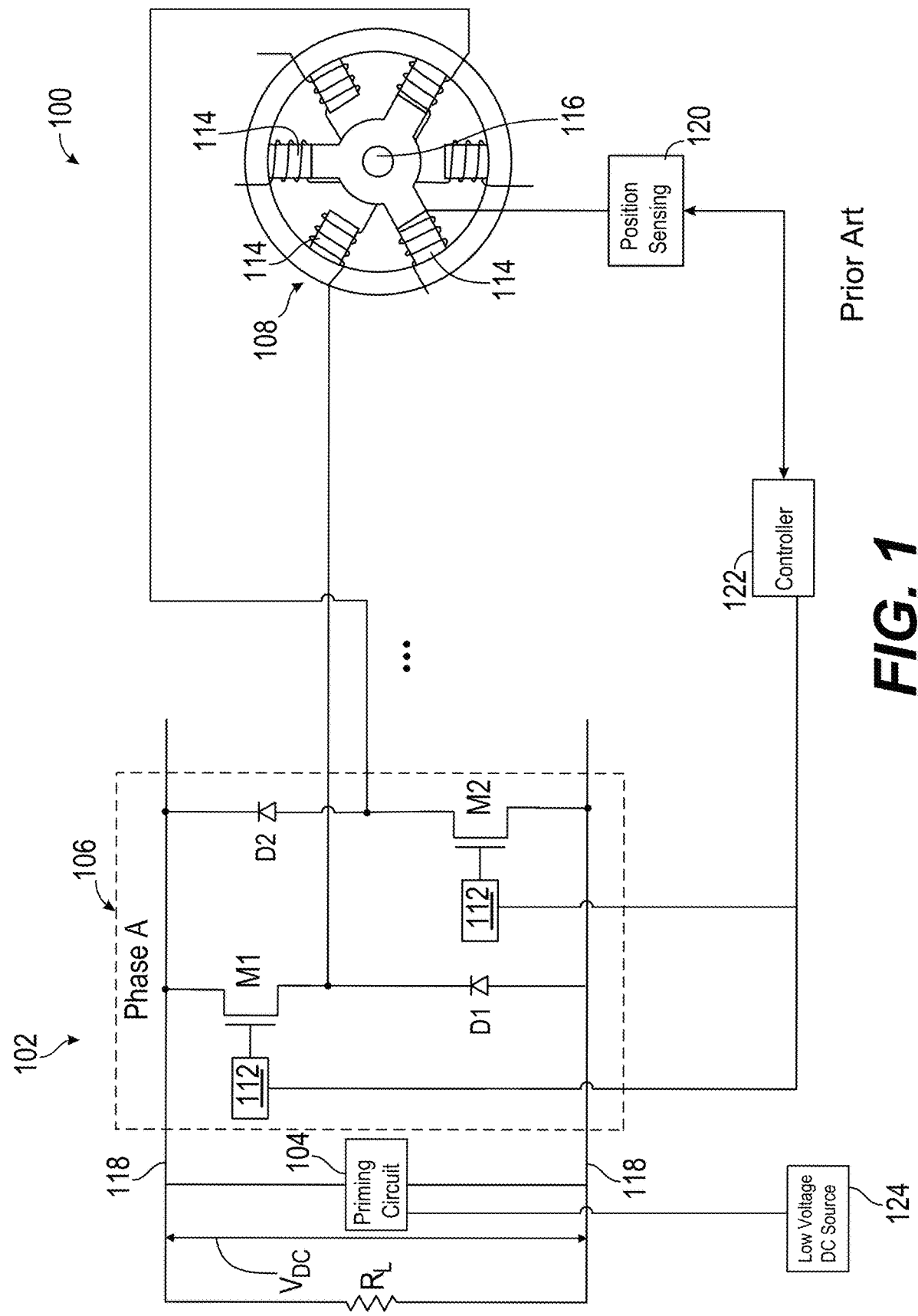
FIG. 1 is a schematic illustration of an example environment with a conventional converter topology with a priming circuit and multiple phase legs.

FIG. 1 is a schematic illustration of an example environment 100 with a conventional converter 102 with a priming circuit 104 and multiple phase legs 106. Although the converter 102 is shown with a single-phase leg 106 (e.g., phase A), the converter 102 may include any suitable number of phase legs (e.g., phase legs B and C), as indicated by the ellipses. For example, the converter may include three phases (e.g., phase A, phase B, and phase C) with corresponding phase legs 106 to convert power generated by a generator 108 to a direct current voltage ($V_{DC}$) The supplied power on each of the phases (e.g., A, B, and C) are of any suitable power level, voltage, and/or current. The voltage and current on each of the phases, assuming three distinct phases, are separated by 120° ($2\pi/3$ rad). Although three phases are discussed here as an example, it should be understood that the disclosure herein applies to any suitable number of phases (e.g., single phase, four phases, etc.). In some cases, the number of phases, and the number of corresponding phase legs 106, depend on the topology of the generator 108. The frequency of the power supplied to each of the phases (A, B, and C) and the corresponding phase legs 106 depends on the rotation frequency of the generator 108 and may be of any suitable frequency.

Each phase leg 106 of the symmetric converter 102 includes two current paths. For example, for phase A, one current path includes a metal oxide semiconductor field effect transistor (MOSFET) M1 and diode D1. The other current path of phase A includes MOSFET M2 and diode D2. Similarly, each of the other phases (e.g., B and C) have two current paths. For example, the phase leg 106 for a phase B would include two MOSFETs and two diodes, similar to the topology of phase leg 106 of phase A. It should be noted that in some cases, each phase leg 106 may include other circuit components, such as one or more half-bridge circuits. In yet other converter 102 circuits, the phase legs 106 may include more than two current paths and/or half-bridge circuits, such as to provide a multilevel rectification of the alternating current (AC) received by the converter 102 from the SR generator 108. The diodes D1, D2 are of any suitable type and may allow current flow in only on direction. The MOSFETs M1, M2 are of any suitable type and include a control node (Gate), and current flow nodes (Source and Drain). Although the converter 102 is depicted to have MOSFETs, it should be appreciated that other active switching devices may be used in place of the MOSFETs, such as bipolar junction transistors (BJTs), insulated gate bipolar transistors (IGBTs), combinations thereof, or the like.

Each current path of phase leg 106 has a gate driver circuit 112 to drive the gate of the corresponding MOSFET (or other switching device). These gate driver circuits 112 receive signals that synchronize the gate drive of their corresponding MOSFET to harvest power from the generator 108. The gate driver circuit 112 is, therefore, able to provide a sufficient voltage and/or current required to operate the MOSFET in any suitable operating regime of the corresponding MOSFET. For example, the gate driver circuit 112 for MOSFET may be configured to provide a gate to source voltage ($V_{GS}$) to the MOSFET that is substantially zero when the corresponding MOSFET is to be turned off (e.g., no drain to source current ($I_{DS}$=0 A). The gate driver circuit 112 may also be configured to provide any suitable $V_{GS}$ to "turn on" the MOSFET and allow current to flow from the drain to the source of the MOSFET, or vice-versa, in any suitable regime of the MOSFET, such as the forward-active regime, the linear regime, or the like. For example, the gate drive circuit 112 may be configured to provide a $V_{GS}$ of about 1 volt to about 50 volts. In some cases, the gate drive circuit may be configured to provide a $V_{GS}$ of about 10 volts to about 35 volts. In one example, the gate drive circuit 112 may provide a $V_{GS}$ of about 25 volts.

The gate drive circuit 112, in some cases, may provide a $V_{GS}$ that has both a positive and negative power supply with voltages $V_P$ and $V_N$, respectively. For example, the gate drive circuit may have a $V_P$ of 15 volts and a $V_N$ of −10 volts. The aforementioned voltages are examples, and the $V_P$ and/or $V_N$ may be any suitable values. In other cases, the gate drive circuits may have a single positive power supply, such as a voltage supply of 25 volts referenced to ground.

The SR generator 108 may include a stator having a plurality of induction coils, or coils 114, and a rotor 116 that may rotate in relative proximity of the coils 114. The rotor 116 may be rotated by a primary mover (not shown) that provides the initial power that is to be converted to DC electrical energy by the SR generator 108 and converter 102. The primary mover may be any suitable system, such as a diesel engine, a gasoline engine, a wind turbine, a water turbine, a steam turbine, or the like.

In some cases, the environment 100 may be incorporated in a generator set that is powered by diesel, gasoline, or other hydrocarbon fuel as a primary mover. This type of generator set may be used as backup power or to provide DC power at locations without other power sources, for example. The environment of 100 may also be incorporated in a hybrid vehicle, such as a gasoline hybrid vehicle that operates its motors using the DC power provided by the converter 102. In yet other cases, the environment 100 may be incorporated in a machine, such as a work machine, where the converter 102 provides DC power to operate the machine, such as to operate motors that propel and/or move the machine. Such machines may include a dozer, loader, excavator, tank, backhoe, drilling machine, trencher, mining truck, harvester, tractor, or any other on-highway or off-highway vehicle.

The SR generator 108 and the converter 102 provides DC power on a power bus, bus lines, power interface, or bus 118, and to be used on any suitable load $R_L$. Although the load $R_L$ is depicted as a resistor, it will be appreciated by skilled practitioners that the load $R_L$ is representative of any suitable circuit receiving power from the converter 102. For example, in some cases, the converter 102 may be coupled to an inverter circuit that receives DC power from the converter 102 and transforms that power to AC power to drive a motor or any other device needing AC power. Alternatively, the bus 118 may be coupled to batteries to charge those batteries. It should be understood that the disclosure herein is not limited by any applications for the DC power provided by the converter 102. The DC voltage $V_{DC}$ on the bus may be any suitable voltage. For example, $V_{DC}$ may be in the range of about 100 volts to about 3000 volts. In some cases, $V_{DC}$ may be in the range of about 700 volts to about 2800 volts. In one example, $V_{DC}$ may be about 700 volts. In another case, $V_{DC}$ may be about 1400 volts. In yet another case, $V_{DC}$ may be about 2800 volts.

The converter 102 provides DC power on the bus 118 by synchronously switching the MOSFETs, via corresponding gate driver circuits 112 to provide a DC voltage ($V_{DC}$) on bus 118. The converter 102 provides DC power on the bus 118 by synchronously switching the MOSFETs, via corresponding gate driver circuits 112, to provide a DC voltage ($V_{DC}$) on bus 118. The environment 100 includes a position sensing module 120 that senses the position of the rotor 116 relative to the coils 114 at any given time. The position sensing module 120 is communicatively coupled to a controller 122 and provides the controller 122 with positional information about the SR generator 108 repeatedly. The controller 122 uses the positional information of the SR generator 108 (e.g., where the rotor 116 is positioned relative to the various coils 114) to synchronously control each of the gate drive circuits 112 to selectively "turn on" or "turn off" their corresponding MOSFETs. In this way, the converter 102 is synchronized with the generator 108 to harvest power from the SR generator 108 and provide DC power, with voltage $V_{DC}$ on the bus 118.

The position sensing module 120 may be of any suitable type, such as a magnetic sensor, hall sensor, optical sensor, combinations thereof, or the like. The position sensing module 120 may provide, to the controller 122, a rotational position of the rotor 116 relative to the one or more coils 114 of the SR generator 108. The position sensing module 120 provides this information to the controller 122, such that the controller 122 synchronizes switching of the MOSFETs of each of the phase legs 106 to optimally harvest power from the converter 102. In some cases, the position sensing module 120 may be integrated with the controller 122, rather than as a discrete module.

In some implementations, the controller 122 may include a central processing unit (CPU), a graphics processing unit (GPU), both CPU and GPU, a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the controller 122 may possess its own local memory, which also may store program modules, program data, and/or one or more operating system(s) to perform the functions described to control the converter 102. The controller 122 may include one or more cores.

In examples, the SR generator 108 does not include any elements that generate magnetic flux passively, like a permanent magnet. As a result, a magnetic flux is to be induced in the coils 114 before the SR generator 108 and the converter 102 is able to provide DC power on the bus 118. With conventional converters 102, the priming circuit 104 is used, when the SR generator 108 starts-up, to provide some current on the bus 118 that induces a generated magnetic field in the coils 114. This induced magnetic field is only needed at start-up, as the magnetic field is self-sustaining when the generator 108 is being used to provide a DC voltage $V_{DC}$ on the bus 118. The priming circuit 104 is invoked, such as by the controller 122, when the SR generator 108 is to be started and/or when the voltage on the bus 118 is not at or near the Vic that the converter 102 is to provide. The priming circuit 104 uses a low voltage DC source 124 to provide a voltage on the bus 118 during start-up of the SR generator 108 to induce a magnetic flux in the coils 114 of the SR generator 108. The priming circuit 104, in some cases, may incorporate low voltage DC source 124 therein. The low voltage DC source 124 may be at any suitable voltage, such as 12 volts, 24 volts or the like.

It should be understood that there may be variations of converter 102 of any suitable type. For example, there may be any number of additional passive or active circuit components. For example, in some cases, there may be a capacitor shunted across the lines of the bus 118. As another example, there may be any number of current limiting resisters included in any of phase legs 106 of the converter 102. The disclosure provided herein can be implemented with converters 102 with any of the variations referred to above.

It will be clear to a person having ordinary skill in the art that the inclusion of the priming circuit 104 along with the low voltage DC source 124 in the converter 102 adds cost, complexity, and size to the converter 102. For example, the priming circuit 104 may include unique power supplies (e.g., voltage supplies, current supplies, etc.), depicted as the low voltage DC source 124, that add circuit components. These circuit components of the priming circuit 104 may also reduce the overall efficiency of the converter 102 due to losses associated with providing another current and/or voltage source for the purposes of priming, or starting, the converter 102 in harvesting power from the SR generator 108.

Although discussed in the context of priming an SR generator, it will be appreciated by those skilled in the art that the gate drive supply may be used for any variety of other applications that may make use of a pre-existing voltage source (e.g., the gate drive voltages), such as testing the converter circuit, diagnostics, and/or calibration. For example, the testing functions may be used during manufacture. As a non-limiting example of the aforementioned testing, a low-voltage test may be performed on a generator (SR generator or otherwise), using the pre-existing DC power supply of the gate drive circuit.

Figure 2:
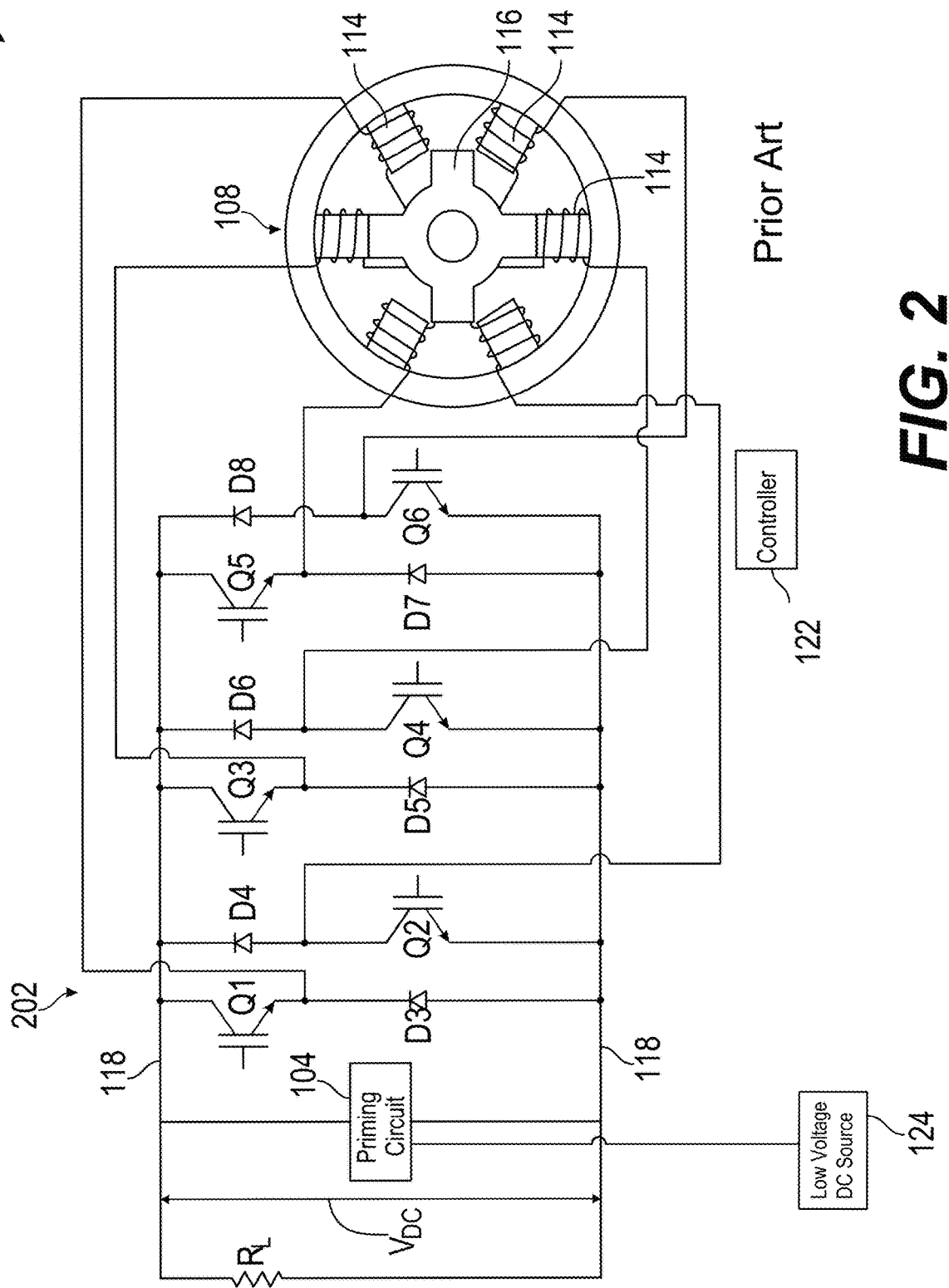
FIG. 2 is a schematic illustration of an example environment with another conventional converter topology with a priming circuit and multiple phase legs.
Figure 3:
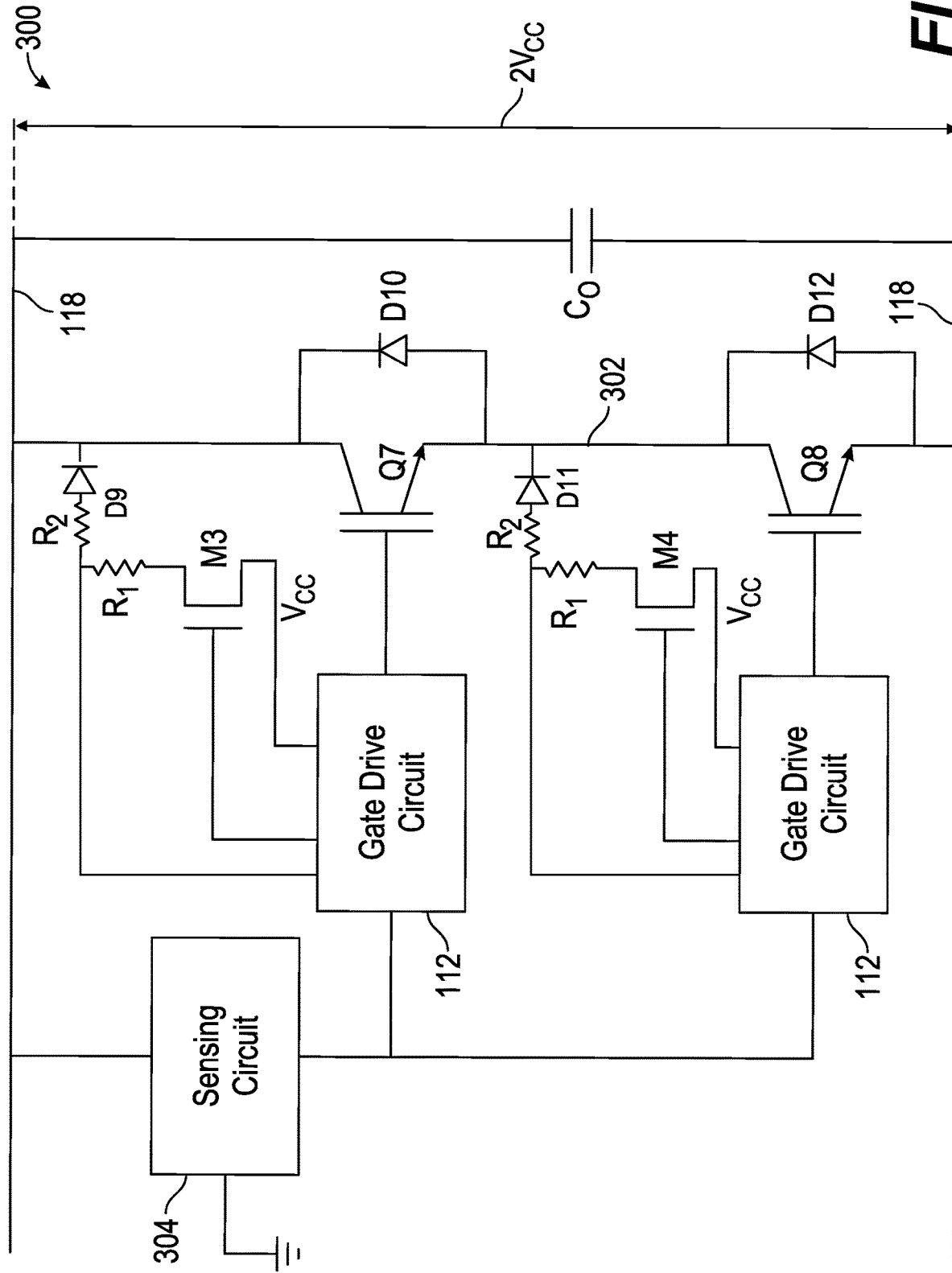
FIG. 3 is a schematic illustration of an example phase leg of a converter, according to examples of the disclosure.
Figure 4:
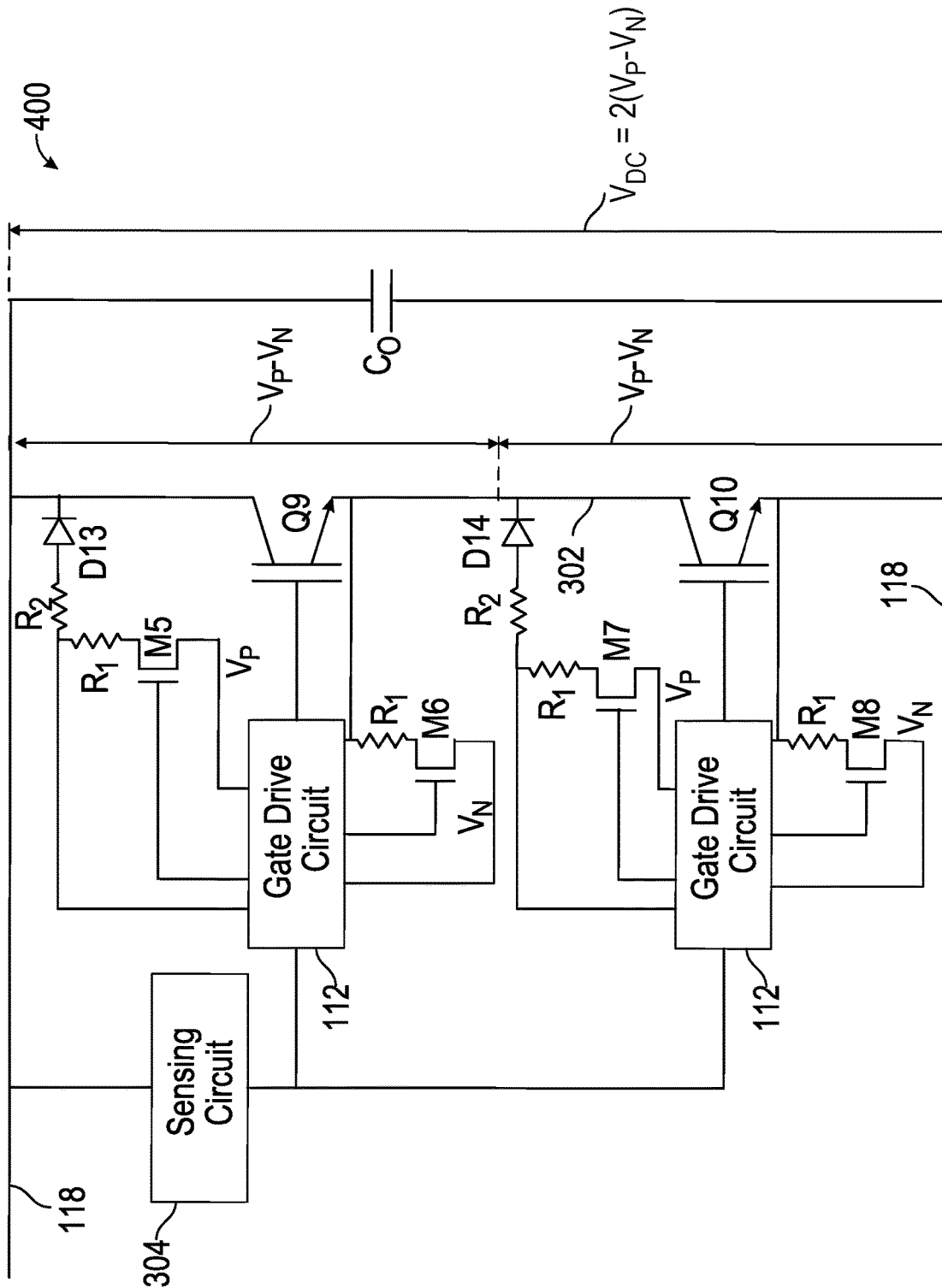
FIG. 4 is a schematic illustration of another example phase leg of a converter, according to examples of the disclosure.

According to examples of the disclosure, a modification to the phase legs 106 are disclosed, with conjunction with FIGS. 3 and 4, that obviate the priming circuit 104 and/or the low voltage DC source 124. As disclosed herein, the function of the priming circuit 104, namely the function of generating magnetic flux in the SR generator 108 at start-up of the SR generator 108, is performed by the one or more gate drive circuits 112. In other words, examples of the disclosure allow streamlining the conventional converter 102 of FIG. 2 with a converter where pre-existing circuit components (e.g., gate driver circuits 112) are used to provide priming function. The converter without a priming circuit 104 provides for improvements relative to conventional converters 102, where the disclosed converter provides for a more compact design, resulting in fewer independent voltage and/or current supplies, less complexity, lower cost, a reduced form-factor, and/or greater reliability.

FIG. 2 is a schematic illustration of an example environment 200 with another conventional converter 202 with a priming circuit 104 and multiple phase legs 106. This conventional converter 202 is similar to converter 102 of FIG. 1 in many ways. Phase A of converter 202 may include a IGBT Q1 in series with diode D3, while IGBT Q2 is in series with diode D4. Similarly, phase B of converter 202 may include a IGBT Q3 in series with diode D5, while IGBT Q4 is in series with diode D6. Further still, phase C of converter 202 may include a IGBT Q5 in series with diode D7, while IGBT Q6 is in series with diode D8.

The asymmetric configuration of the converter 202 allows for independent control of each shunt between the lines of the bus 118. For example, the IGBTs of a particular phase of the converter 202 do not need to be perfectly out of phase (180° out of phase) with each other. This may allow for overlapping switching of IGBTs within a phase, potentially resulting in greater efficiency of operation compared to symmetric operation. As with converter 102, converter 202 may have any suitable number of phases. Here, converter 202 is shown to have three phases, as an example. It should be understood that the converter 202 may have any suitable number of phase legs 106 corresponding to phases of the converter 202, such as four phases or two phases. In some cases, the number of phases of converter 202 may depend on how many coils 114 the generator 108 has. Additionally, the converter 202 is shown as a two-level converter. However, converter 202 may be configured to have any suitable number of levels (e.g., four level, eight level, etc.). The operation and use of converter 202 is substantially similar to converter 102 of FIG. 1, and in the interest of brevity will not be repeated here.

In the interest of clarity, several components are not shown in the schematic drawing of SR generator 108 and/or converter 202. For example, the position sensing module 120 is not shown in FIG. 2, but the position sensing module 120 is used in conjunction with SR generator 108 and controller 122 to synchronize operation of converter 202 with SR generator 108. Furthermore, each of the IGBTs have a gate driver circuit 112 coupled to each gate of the IGBTs. It should be understood that active switching devices other than IGBTs (e.g., MOSFETs, BJTs, etc.) may be used instead of IGBTs in converter 202. Regardless of what type of switching device is used, that switching device would have a control node, similar to the gate of the IGBT, that is driven and/or controlled by the gate drive circuits 112.

It should be understood that there may be variations of converter 202 of any suitable type. For example, there may be any number of additional passive or active circuit components. For example, in some cases, there may be a capacitor shunted across the lines of the bus 118. As another example, there may be any number of current limiting resisters included in any of phase legs 106 of the converter 202. The disclosure provided herein can be implemented with converters 202 with any of the variations referred to above.

As in converter 102, converter 202 includes the priming circuit 104, along with low voltage DC source 124, to induce magnetic flux in the coils 114 of the SR generator 108 as generation is initiated. In this way, converter 202, like converter 102, operates in a conventional manner. However, as disclosed herein, phase legs of converters are disclosed that can replace the phase legs 106 of converter 102 and/or converter 202, such that a priming circuit 104 is not needed. As disclosed herein, the gate drive circuits 112 can be used to provide a priming current on the bus 118, when power generation is to be commenced. The converter without a priming circuit 104 provides for improvements relative to conventional converters 202, where the disclosed converter provides for a more compact design, resulting in fewer independent voltage and/or current supplies, less complexity, lower cost, a reduced form-factor, and/or greater reliability. Regardless of the exact type of converter 102, 202, the example phase legs, as disclosed herein, allow for elimination of the priming circuit 104. Rather the priming function is performed by the one or more gate driver circuits 112.

FIG. 3 is a schematic illustration of an example phase leg 300 of a converter, according to examples of the disclosure. Although the phase leg 300 is shown with a specific topology, it should be understood that the phase leg 300 can be similarly implemented with variations of similar topology. As shown, phase leg 300 includes gate drive circuits 112 that may be coupled to the IGBT Q7 and IGBT Q8. Although the phase leg 300 is depicted with certain circuit elements, there may be other circuit elements added or circuit elements removed from those depicted here, according to examples of the disclosure. For example, phase leg 300 may include an output capacitor $C_O$ shunted across the lines of the bus 118 to smooth any noise on the bus 118. However, in some cases, the output capacitor $C_O$ may not be included or other circuit elements may be used instead or in addition to achieve the same smoothing functionality.

In some examples, the gate drive circuits 112 are further coupled to MOSFETs M3 and M4. The gate drive circuits 112 are configured to provide a priming enable signal to the gate of the respective MOSFET M3, M4. The drain of the MOSFETs M3 and M4 may be coupled to a voltage source ($V_{CC}$) generated by the gate drive circuit 112. Although the switch to turn on or off the priming voltage on the bus 118 is depicted and discussed herein to be MOSFETs, it should be appreciated that other active switching devices may be used in place of the MOSFETs, such as BJTs, IGBTs, combinations thereof, or the like. The MOSFETs M3, M4 may be of any suitable type, such as n-type, p-type, etc. The MOSFETs M3, M4 may further be of any suitable size and be rated for any suitable current level, current density, voltage, etc.

The phase leg 300 may also include one or more backflow diodes D9, D11 to prevent backflow of current through the MOSFETs M3, M4 when the converter with phase leg 300 is in operation. Without the backflow diodes, current may flow into the MOSFETs M3, M4, as well as the gate drive circuit 112, when the converter with phase leg 300 is operating to harvest power from SR generator 108. Further still, the phase leg 300 may include one or more current limiting resistors $R_1$, $R_2$. The current limiting resistors $R_1$, $R_2$ allow for a suitable amount of current to flow through coils 114 of the generator 108 during a priming operation. The current limiting resistor $R_1$, $R_2$ may be used because the gate drive circuit 112 and the MOSFETs M3, M4 provide a voltage onto the bus 118. However, the corresponding current provided by the gate drive circuit onto the bus 118 may be variable and/or uncontrolled without the current limiting resistors $R_1$, $R_2$. It should be understood that although the two current limiting resistors $R_1$, $R_2$ are depicted as having the same resistance in phase leg 300, in other cases, the current limiting resisters may have different values. For example, the current limiting resistors connected to M3 may have a greater resistance than the current limiting resistors connected to M4, or vice-versa.

By providing $V_{CC}$ on the bus 118 and/or a center tap 302 of the phase leg 300, the gate drive circuit 112 is able to apply a voltage of $V_{CC}$ or 2 times $V_{CC}$ ($2V_{CC}$) across the lines of the bus 118. Thus, with this phase leg design, the voltage source that is used to drive the IGBTs Q7, Q8, as in a conventional converter 102, 202, is used for gate drive, but also for priming. When the voltage source for gate drive function is a positive voltage ($V_{CC}$) referenced to ground, in the phase leg 300 a priming voltage of about twice that amount ($2V_{CC}$) may be available for priming the SR generator 108, when the SR generator 108 starts up.

The gate drive voltage may be of any suitable level. For example, $V_{CC}$ may be anywhere in the range of about 5 volts to about 50 volts. Thus, the priming voltage ($2V_{CC}$) may be in the range of about 10 volts to about 100 volts. In other examples, $V_{CC}$ may be anywhere in the range of about 10 volts to about 30 volts. Thus, the priming voltage ($2V_{CC}$) may be in the range of about 20 volts to about 60 volts. In yet other examples, $V_{CC}$ may be anywhere in the range of about 10 volts to about 20 volts. Thus, the priming voltage ($2V_{CC}$) may be in the range of about 20 volts to about 40 volts. For example, in one case, the gate drive voltage may be about 15 volts referenced to ground, and as a result, the priming voltage may be about 30 volts. It should also be understood that if only one of the gate drive circuits 112 are used for providing the priming voltage, then the priming voltage on the bus 118 will be about $V_{CC}$.

It should be understood that in some cases, the gate drive circuit 112 may be configured to provide more than one voltage source. For example, the gate drive circuit 112 may be configured to provide both a positive voltage ($V_P$) and a negative voltage ($V_N$). In the phase leg 300, only one of the voltage sources may be used to provide the priming voltage when the SR generator 108 is started up. However, other variations of phase leg 300 may make use of more than one voltage provided by the gate drive circuit for the purposes of priming. For example, the use of both $V_P$ and $V_N$ for priming is discussed in conjunction with FIG. 4.

The phase leg 300 may further include a sensing circuit 304 that measures the voltage on the bus 118 and/or compares the voltage on the bus to a reference or threshold voltage. In this way, if the voltage on the bus 118 is less than a threshold level, the sensing circuit 304 may detect that condition. In that case, the sensing circuit may indicate to the gate drive circuit 112 that the bus voltage is less than the threshold and, in turn, the gate drive circuit may generate a priming enable signal that is provided to the gate of the corresponding MOSFET to provide the gate drive voltage onto the bus 118 for the purposes of priming the SR generator 108. In other cases, the sensing circuit 304 itself may generate the priming enable signal and provide that priming enable signal directly to the gate of the MOSFET, when the bus voltage is below a threshold level. In these cases, the sensing circuit may directly be electrically coupled to the control (e.g., gate) node of the MOSFET M3, M4. It should be understood that in some cases, there converter with phase leg 300 may include a single sensing circuit 304 that provides an indication of the bus voltage to gate drive circuits 112 and/or MOSFETs of other phase legs 300 of the converter.

The sensing circuit 304 may include any variety of components (not shown). In some cases, the sensing circuit 304 may include a volt meter to measure the voltage on the bus 118. In the same or other cases, the sensing circuit 304 may include a comparator that compares the voltage on the bus to a threshold voltage level. The threshold voltage level, in this case, may be any suitable level that indicates that the SR generator 108 has not been primed and, therefore, power is not being harvested from the SR generator 108. For example, the threshold voltage may be substantially zero (e.g., zero volts, 0.01 volts, 0.1 volts, 0.2 volts, etc.). In some examples, the threshold voltage may be set marginally above zero so that electrical noise on the bus 118 does not affect any comparison to the threshold voltage level. In other cases, the threshold voltage level may be set to any suitable value, such as 1 volt, 5 volts, 10 volts, etc. In yet other cases, the threshold voltage level may be set to one or more of the voltage levels provided for gate drive functions, such as $V_{CC}$, $V_P$, or the like. In still other examples, the threshold voltage level may be set to a voltage value equal to what is used to turn on the MOSFETS M3, M4 (e.g., gate-to-source voltage, $V_{GS}$), such as the priming enable signal voltage level. In some cases, the MOSFET gate-to-source voltages ($V_{GS}$) used may be approximately in the range of about 1 volt to about 15 volts. In some cases, the $V_{GS}$ may be 5 volts, 3.3 volts, 2.2 volts, 1.7 volts, or the like.

As discussed herein, the configuration of the phase leg 300, if substituted for the phase leg(s) 106 of converters 102, 202, would obviate the priming circuit 104 in those converters 102, 202. This is because the gate drive circuit and its voltage sources are used to both drive IGBTs Q7, Q8, but also to provide priming voltage on the bus 118. Thus, a converter without a priming circuit 104 due to phase leg 300 provides for improvements relative to conventional converters 102, 202, with a streamlined design, resulting in fewer independent voltage and/or current supplies, less complexity, lower cost, a reduced form-factor, and/or greater reliability.

FIG. 4 is a schematic illustration of another example phase leg 400 of a converter, according to examples of the disclosure. Although the phase leg 400 is shown as one implemented in a symmetric converter, it should be understood that the phase leg 400 can be similarly implemented in an asymmetric converter. Phase leg 400 makes use of multiple voltage sources of the gate drive circuit 112 to provide a potentially larger priming voltage on the bus 118, compared to phase leg 300 of FIG. 3. As shown, phase leg 400 includes gate drive circuits 112 that may be coupled to the IGBT Q9 and IGBT Q10. Although the phase leg 400 is depicted with certain circuit elements, there may be other circuit elements added or circuit elements removed from those depicted here, according to examples of the disclosure. For example, phase leg 400 may include an output capacitor $C_O$ shunted across the lines of the bus 118 to smooth any noise on the bus 118. However, in some cases, the output capacitor $C_O$ may not be included or other circuit elements may be used instead or in addition to achieve the same smoothing functionality.

In some examples, the gate drive circuits 112 are further coupled to MOSFETs M5, M6, M7, and M8. In some cases, the gate drive circuits 112 are configured to provide a priming enable signal to the gate of the respective MOSFET M5, M6, M7, M8. The drain of the MOSFETs M5, M6, M7, M8 may be coupled to one of two voltage sources ($V_P$ or $V_N$) generated by the gate drive circuit 112. Although the switch to turn on or off the priming voltage on the bus 118 is depicted and discussed herein to be MOSFETs, it should be appreciated that other active switching devices may be used in place of the MOSFETs, such as BJTs, IGBTs, combinations thereof, or the like. The MOSFETs M5, M6, M7, M8 may be of any suitable type, such as n-type, p-type, etc. The MOSFETs M5, M6, M7, M8 may further be of any suitable size and be rated for any suitable current level, current density, voltage, etc.

The phase leg 400 may also include one or more backflow diodes D13, D14 to prevent backflow of current through the MOSFETs M5, M6, M7, M8 when the converter with phase leg 400 is in operation. Without the backflow diodes, current may flow into the MOSFETs M5, M6, M7, M8, as well as the gate drive circuit 112, when the converter with phase leg 400 is operating to harvest power from SR generator 108. Further still, the phase leg 400 may include one or more current limiting resistors $R_1$, $R_2$. The current limiting resistors $R_1$, $R_2$ allow for a suitable amount of current to flow through coils 114 of the generator 108 during a priming operation. The current limiting resistor $R_1$, $R_2$ may be used because the gate drive circuit 112 and the MOSFETs M5, M6, M7, M8 provide a voltage onto the bus 118. However, the corresponding current provided by the gate drive circuit 112 onto the bus 118 may be variable and/or uncontrolled without the current limiting resistors $R_1$, $R_2$. It should be understood that although the current limiting resistors $R_1$, $R_2$ are depicted as having the same resistance in phase leg 400, in other cases, the current limiting resisters may have different values.

By providing voltage $V_P$-$V_N$ on the bus 118 and a center tap 302 of the phase leg 400, the gate drive circuit 112 is able to apply a voltage of about $2(V_P$-$V_N)$ across the lines of the bus 118. Thus, with this phase leg design, the voltage source that is used to drive the IGBTs Q9, Q10, as in a conventional converter 102, 202, is used for gate drive, but also for priming. When the voltage source for gate drive function is a voltage $V_P$-$V_N$, in the phase leg 400 a priming voltage of about twice that amount $2(V_P$-$V_N)$ may be available for priming the SR generator 108, when the SR generator 108 starts up.

The gate drive voltage may be of any suitable level. For example, $V_P$ may be anywhere in the range of about 5 volts to about 50 volts and $V_N$ may be anywhere in the range of about −5 volts to −50 volts. Thus, the priming voltage $2(V_P$-$V_N)$ may be in the range of about 20 volts to about 200 volts. In other examples, $V_P$ may be anywhere in the range of about 10 volts to about 30 volts and $V_N$ may be anywhere in the range of about −10 volts to −30 volts. Thus, the priming voltage $2(V_P$-$V_N)$ may be in the range of about 40 volts to about 120 volts. For example, in one case, the gate drive circuits 112 may have a $V_P$ of about 15 volts and a $V_N$ of about −10 volts. In this case, the gate drive circuits 112 may be configured to provide a priming voltage of about 50 volts.

The phase leg 400 may further include the sensing circuit 304, as described in conjunction with FIG. 3, that measures the voltage on the bus 118 and/or compares the voltage on the bus 118 to a reference or threshold voltage. In this way, if the voltage on the bus 118 is less than a threshold level, the sensing circuit 304 may detect that condition. In that case, the sensing circuit may indicate to the gate drive circuit 112 that the bus voltage is less than the threshold and, in turn, the gate drive circuit may generate a priming enable signal that is provided to the gate of the corresponding MOSFET M5, M6, M7, M8 to provide the gate drive voltage onto the bus 118 for the purposes of priming the SR generator 108. In other cases, the sensing circuit 304 itself may generate the priming enable signal and provide that priming enable signal directly to the gate of the MOSFET M5, M6, M7, M8, when the bus voltage is below a threshold level. In these cases, the sensing circuit 304 may directly be electrically coupled to the control (e.g., gate) node of the MOSFET M5, M6, M7, M8.

The sensing circuit 304 may include any variety of components (not shown). In some cases, the sensing circuit 304 may include a volt meter to measure the voltage on the bus 118. In the same or other cases, the sensing circuit 304 may include a comparator that compares the voltage on the bus 118 to a threshold voltage level. The threshold voltage level, in this case, may be any suitable level that indicates that the SR generator 108 has not been primed and, therefore, power is not being harvested from the SR generator 108. For example, the threshold voltage may be substantially zero (e.g., zero volts, 0.01 volts, 0.1 volts, 0.2 volts, etc.). In some examples, the threshold voltage may be set marginally above zero so that electrical noise on the bus 118 does not affect any comparison to the threshold voltage level. In other cases, the threshold voltage level may be set to any suitable value, such as 1 volt, 5 volts, 10 volts, etc. In yet other cases, the threshold voltage level may be set to one or more of the voltage levels provided for gate drive functions, such as $V_{CC}$, $V_P$, or the like. In still other examples, the threshold voltage level may be set to a voltage value equal to what is used to turn on the MOSFETS M5, M6, M7, M8 (e.g., $V_{GS}$), such as the priming enable signal voltage level. In some cases, the MOSFET gate-to-source voltages ($V_{GS}$) used may be approximately in the range of about 1 volt to about 15 volts. In some cases, the $V_{GS}$ may be 5 volts, 3.3 volts, 2.2 volts, 1.7 volts, or the like.

As discussed herein, the configuration of the phase leg 400, if substituted for the phase leg(s) 106 of converters 102, 202, would obviate the priming circuit 104 in those converters 102, 202. This is because the gate drive circuit 112 and its voltage sources are used to both drive IGBTs Q15, Q16, but also to provide priming voltage on the bus 118. Thus, a converter without a priming circuit 104 due to phase leg 300 provides for improvements relative to conventional converters 102, 202, with a streamlined design, resulting in fewer independent voltage and/or current supplies, less complexity, lower cost, a reduced form-factor, and/or greater reliability.

Figure 5:
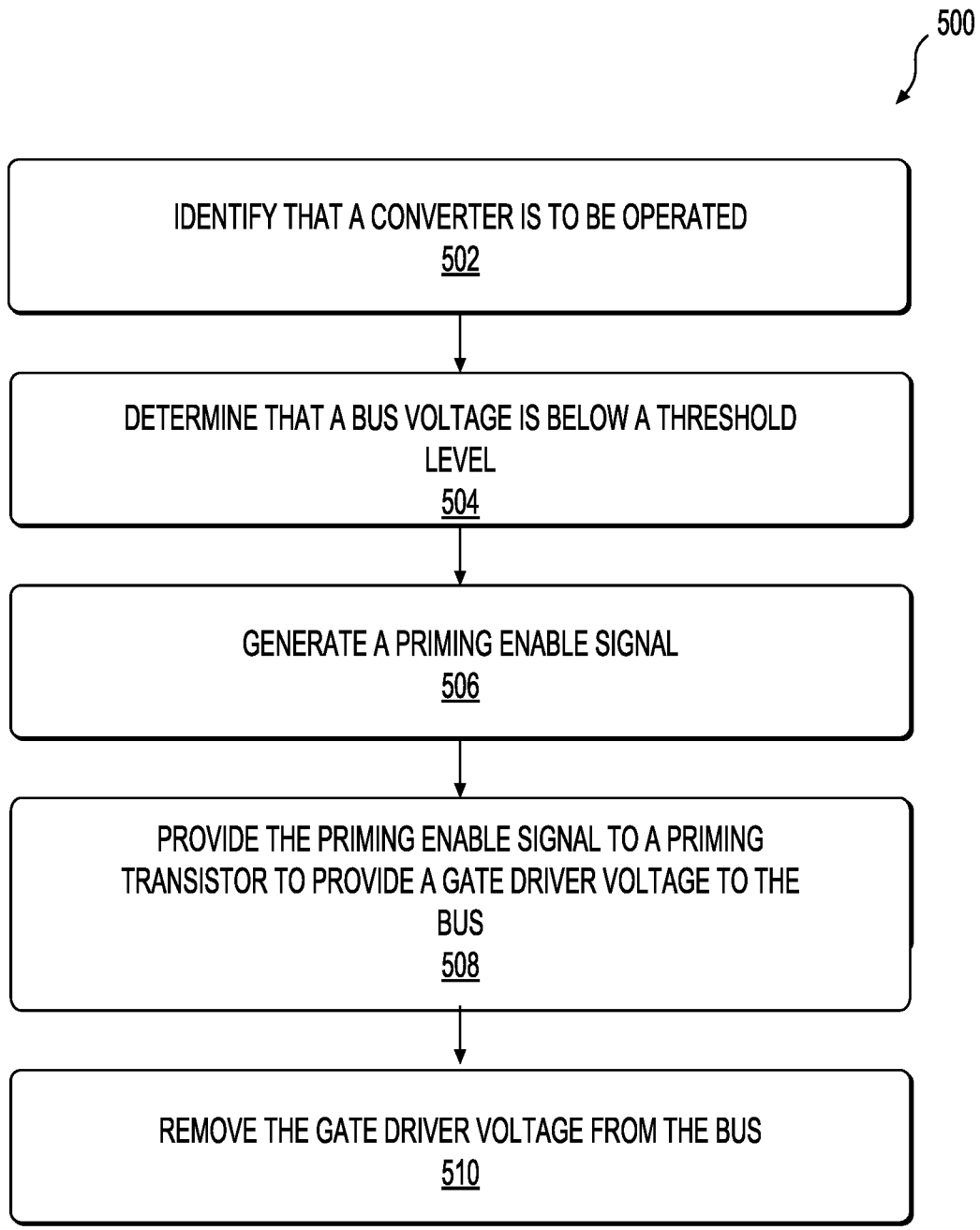
FIG. 5 is a flow diagram depicting an example method for starting up an switched reluctance generator as depicted in FIG. 1, according to examples of the disclosure.

FIG. 5 is a flow diagram depicting an example method for starting up an switched reluctance generator 108 as depicted in FIG. 1, according to examples of the disclosure. The method 500 may be performed by the gate drive circuit 112, the sensing circuit 304, the controller 122, and/or any combination of the aforementioned elements.

At block 502, the gate drive circuit 112 may identify that a converter is to be operated. In some cases, the controller 122 may commence providing commutating signals to the gate drive circuit 112 to synchronize the operations of the converter, with phase leg 300, 400, to the SR generator 108. The gate drive circuit 112 may recognize that power is to be harvested from the SR generator 108 when the gate drive circuit 112 is supplied with the commutation signals from the controller 122.

At block 504, the gate drive circuit 112 may determine that a bus voltage is below a threshold level. This determination may be based on receiving a signal indicating that the bus voltage is below a threshold level from the sensing circuit 304. Alternatively, the sensing circuit 304 may determine that the bus voltage is below the threshold, such as in a similar mechanism as a comparator. In one case, the sensing circuit 304 may compare the bus voltage to a reference, such as a voltage source of the gate drive circuit 112, such as $V_{CC}$ or $V_P$. In other cases, the sensing circuit 304 may compare the bus voltage to any other reference, such as zero or a voltage source to switch the MOSFETS, such as $V_{GS}$. Regardless of the threshold voltage level, the sensing circuit 304 is able to determine if the bus voltage is below that level, and optionally communicate that comparison to the gate drive circuit 112.

At block 506, the gate drive circuit 112 may generate a priming enable signal. This priming enable signal may be based at least in part on the bus voltage being under the threshold voltage level, as determined by the operations of block 504. In some cases, the priming enable voltage may be at a level that is sufficient to turn on one or more of the MOSFETs M3, M4, M5, M6, M7, M8, such as 5 volts, 3.3 volts, 2.2 volts, 1.7 volts, or any other suitable voltage from gate-to-source ($V_{GS}$) value that would switch the corresponding MOSFET. In other cases, the priming enable signal may be generated by the sensing circuit 304. For example, in one case, the priming enable signal may be an output of a comparator of the sensing circuit 304, where the output is high (e.g., at a level that turns on a MOSFET) when the bus voltage is less than the threshold voltage level.

At block 508, the gate drive circuit 112 may provide the priming enable signal to a priming transistor (e.g., MOSFET) to provide a gate driver voltage to the bus 118. When the priming enable signal is put on the gate of the corresponding MOSFET M3, M4, M5, M6, M7, M8. As discussed herein, the priming enable signal may be of any suitable voltage level that would turn on the corresponding MOSFET, such as a $V_{GS}$ that is greater than the $V_{th}$ of the MOSFET, to operate the MOSFET in a forward-active or linear region. In some cases, the priming enable signal may be provided to the gate of the MOSFET M3, M4, M5, M6, M7, M8 directly from the sensing circuit 304.

At block 510, the gate drive circuit 112 may remove the gate driver voltage from the bus 118. This gate driver voltage may be removed when the magnetic flux at the SR generator 108 is self-sustaining. In some cases, the sensing circuit 304 may indicate to the gate drive circuit 112 that the bus voltage is above the threshold voltage level. In other cases, where the sensing circuit 304 provides the priming enable signal to the corresponding MOSFET, the priming enable signal may drop to substantially zero when the bus voltage rises above the threshold voltage when DC power is being harvested from the SR generator 108. For example, in some cases, the sensing circuit 304 may include a comparator that is coupled to the gate of a MOSFET and when the bus voltage is less than the threshold voltage level, the sensing circuit couples a high signal from its comparator directly to the MOSFET gate. As the SR generator 108 provides DC voltage on the bus 118 and the bus voltage rises above the threshold level, the comparator of the sensing circuit 304 may output a low voltage level (e.g., substantially zero), which in turn, turns off the MOSFET to isolate or remove the priming voltage from the bus 118.

It will be appreciated that the method 500 may be performed in a repeated fashion with any suitable frequency to continuously and/or intermittently monitor the voltage provided on the bus 118. Repetition of the method 500 may be with any suitable frequency, such as every 100 milliseconds, every second, every 30 seconds, or the like. By repeatedly performing the method 500, the converter may be operated without a priming circuit and look for any time when the bus voltage is below a threshold level. Alternatively, the method 500 may be performed only when there is an indication, such as from the controller 122, that the SR generator 108 is to be operated. In some cases, there may be provided a sensing enable signal to the sensing circuit 304 when the controller 122 commences generating commutation signals to synchronize the converter to the SR generator 108.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

It should be noted that the method 500 provides a mechanism to prime a converter without a dedicated priming circuit 104. By not having a dedicated priming circuit 104, a converter with the phase legs 300, 400 can operate according to method 500 in a more efficient and reliable way. Additionally the converter without a priming circuit 104 does not have the added complexity, size, and cost associated with a priming supply, compared to conventional converters 102, 202 for SR generators 108, when operating according to the method 500.

INDUSTRIAL APPLICABILITY

The present disclosure describes systems, structures, and methods to provide priming function to an SR generator 108, without the use of a dedicated priming circuit 104. Because SR generators 108 are not self-fluxing, or in other words, SR generators 108 do not have components that passively generate an electric field, a priming function is to be performed before power is harvested from the SR generator 108. A priming circuit 104, as provided on a conventional converter 102, 202, generally requires additional circuit components. For example, the priming circuit 104 of conventional converters 102, 202 has a separate power supply (e.g., DC voltage) that is provided on the bus 118. The priming circuit 104, in general, adds extra circuit components and materials to the converter 102, 202. Furthermore, these components can fail over time, leading to reduced reliability, compered to if a priming circuit 104 is not provided on a converter. The priming circuit itself can add complexity, cost, and size to a conventional converter 102, 202.

By using the gate drive circuits 112, that are already a part of a converter, to provide priming functions, such as by providing a DC voltage that can be shunted to the bus 118, the converter is made less complex. Additionally, the converter with gate drive circuits 112 providing priming voltage on the bus 118, the electronic components and/or materials used for fabricating the priming circuit 104 are eliminated, resulting in reduced cost and reduced complexity. Furthermore, converters, as disclosed herein can be fabricated with a smaller footprint and/or form-factor and may be more reliable than conventional converters 102, 202.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A converter, comprising:
   a bus; and
   at least one phase leg, the at least one phase leg including a first phase leg comprising:
      an insulated gate bipolar transistor (IGBT);
      a metal oxide semiconductor field effect transistor (MOSFET);
      a gate drive circuit electrically coupled to a first gate of the IGBT and a first node of the MOSFET, the gate drive circuit configured to:
         selectively provide a gate drive voltage to the gate of the IGBT based at least in part on a commutation signal received from a controller; and
         provide, when the MOSFET is turned on, the gate drive voltage to the bus.

2. The converter of claim 1, further comprising:
   a sensing circuit configured to generate a priming enable signal, wherein the priming enable signal is provided to a control node of the MOSFET to shunt the gate drive voltage to the bus.

3. The converter of claim 2, wherein the priming enable signal turns on the MOSFET.

4. The converter of claim 2, wherein the sensing circuit is configured to compare a bus voltage on the bus to a threshold voltage level and provide the priming enable signal when the bus voltage is less than the threshold voltage level.

5. The converter of claim 4, wherein the MOSFET turns off when the bus voltage is above the threshold voltage level.

6. The converter of claim 1, wherein the gate drive voltage is in a range of 10 volts to 50 volts.

7. The converter of claim 1, wherein the first phase leg further comprises:
   a second IGBT;
   a second MOSFET coupled to a center tap of the first phase leg;
   a second gate drive circuit electrically coupled to a second gate of the second IGBT and a second node of the second MOSFET, the second gate drive circuit configured to:
      selectively provide the second gate drive voltage to the second gate of the second IGBT based at least in part on a second commutation signal received from the controller; and provide, when the second MOSFET is turned on, the second gate drive voltage to the center tap of the first phase leg.

8. The converter of claim 7, further comprising:
a sensing circuit configured to generate a priming enable signal, wherein the priming enable signal is provided to a control node of the second MOSFET to provide the second gate drive voltage to the center tap.

9. The converter of claim 1, further comprising:
a second phase leg comprising:
    a second IGBT;
    a second MOSFET;
    a second gate drive circuit electrically coupled to a second gate of the second IGBT and a second node of the second MOSFET, the second gate drive circuit configured to:
        selectively provide the second gate drive voltage to the second gate of the second IGBT based at least in part on a second commutation signal received from the controller; and
        provide the second gate drive voltage to the second node of the MOSFET, such that when the second MOSFET is turned on, the second gate drive voltage is provided to the bus.

10. A system, comprising:
a switched reluctance (SR) generator;
a bus electrically coupled to the SR generator; and
a converter comprising a first phase leg, the first phase leg comprising:
    an insulated gate bipolar transistor (IGBT);
    a metal oxide semiconductor field effect transistor (MOSFET);
    a gate drive circuit electrically coupled to a first gate of the IGBT and a first node of the MOSFET, the gate drive circuit configured to:
        control the IGBT based at least in part on a commutation signal received from a controller; and
        provide a gate drive voltage on the bus via the MOSFET, wherein providing the gate drive voltage on the bus via the MOSFET induces a magnetic field in one or more coils of the SR generator.

11. The system of claim 10, further comprising:
a sensing circuit configured to generate a priming enable signal when a bus voltage on the bus is less than a threshold voltage level, wherein the priming enable signal is provided to a control node of the MOSFET to provide the gate drive voltage to the bus.

12. The system of claim 11, wherein the sensing circuit is configured to turn off the MOSFET when the bus voltage is greater than the threshold voltage level.

13. The system of claim 10, wherein energy is harvested from the SR generator based at least in part on the inducing the magnetic field in the one or more coils of the SR generator.

14. The system of claim 10, wherein the first phase leg further comprises:
a second IGBT;
a second MOSFET coupled to a center tap of the first phase leg;
a second gate drive circuit electrically coupled to a second gate of the second IGBT and a second node of the second MOSFET, the second gate drive circuit configured to:
    selectively provide the second gate drive voltage to the second gate of the second IGBT based at least in part on a second commutation signal received from the controller; and
    provide, when the second MOSFET is turned on, the second gate drive voltage to the center tap of the first phase leg.

15. The system of claim 14, further comprising:
a sensing circuit configured to generate a priming enable signal when a bus voltage on the bus is less than a threshold voltage level, wherein the priming enable signal is provided to a control node of the second MOSFET to provide the second gate drive voltage to the center tap.

16. The system of claim 10, further comprising:
a second phase leg comprising:
    a second IGBT;
    a second MOSFET;
    a second gate drive circuit electrically coupled to a second gate of the second IGBT and a second node of the second MOSFET, the second gate drive circuit configured to:
        selectively provide the second gate drive voltage to the second gate of the second IGBT based at least in part on a second commutation signal received from the controller; and
        provide the second gate drive voltage to the second node of the MOSFET, such that when the second MOSFET is turned on, the second gate drive voltage is provided to the bus.

17. The system of claim 16, further comprising:
a third phase leg comprising:
    a third IGBT;
    a third MOSFET;
    a third gate drive circuit electrically coupled to a third gate of the third IGBT and a third node of the third MOSFET, the third gate drive circuit configured to:
        selectively provide the third gate drive voltage to the third gate of the third IGBT based at least in part on a third commutation signal received from the controller; and
        provide the third gate drive voltage to the third node of the MOSFET, such that when the third MOSFET is turned on, the gate drive voltage is provided to the bus.

18. A method, comprising:
receiving, from a controller, a commutation signal;
providing, by a gate drive circuit of a converter and based at least in part on the commutation signal, a gate drive voltage on a gate of an insulated gate bipolar transistor (IGBT);
providing, by the gate drive circuit, the gate drive voltage on a node of a metal oxide semiconductor field effect transistor (MOSFET), the MOSFET coupled to a bus of the converter;
determining, by a sensing circuit, that a bus voltage on the bus is less than a threshold level; and
providing, based at least in part on the bus voltage being less than the threshold level, a priming enable signal on a gate of the MOSFET to conduct the gate drive voltage to the bus.

19. The method of claim 18, further comprising:
determining, by the sensing circuit, that the bus voltage on the bus is greater than a threshold level; and
removing, based at least in part on the bus voltage being greater than the threshold level, the priming enable signal from the gate of the MOSFET to block the gate drive voltage to the bus.

20. The method of claim 18, wherein conducting the gate drive voltage on the bus induces a magnetic field in one or more coils of an SR generator.

* * * * *